US006613219B2

(12) United States Patent
Harter et al.

(10) Patent No.: US 6,613,219 B2
(45) Date of Patent: Sep. 2, 2003

(54) DEVICE FOR DISTRIBUTING A POLY-PHASE MIXTURE OVER A BED OF A GRANULAR SOLID, COMPRISING A POROUS JET DISTURBER ELEMENT

(75) Inventors: Isabelle Harter, Lyons (FR); Robert Agoero, Vienne (FR)

(73) Assignee: Institut Francais du Petrole, Cedex (FR)

( * ) Notice: Subject to any disclaimer, the term of this patent is extended or adjusted under 35 U.S.C. 154(b) by 199 days.

(21) Appl. No.: 09/835,831

(22) Filed: Apr. 17, 2001

(65) Prior Publication Data

US 2001/0055548 A1 Dec. 27, 2001

(30) Foreign Application Priority Data

Apr. 17, 2000 (FR) .......................................... 2000 05021

(51) Int. Cl.[7] .............................. C10G 45/00; B01J 8/00
(52) U.S. Cl. ...................... 208/146; 585/922; 585/923; 422/195; 422/220; 422/224
(58) Field of Search ........................ 208/146; 422/195, 422/220, 224; 585/922, 923

(56) References Cited

U.S. PATENT DOCUMENTS

| | | | | |
|---|---|---|---|---|
| 2,898,292 A | * | 8/1959 | Halik et al. .................. 208/250 |
| 3,112,256 A | * | 11/1963 | Young et al. ................ 208/213 |
| 3,431,084 A | | 3/1969 | Forbes ......................... 208/178 |
| 3,524,731 A | | 8/1970 | Effron et al. ................ 422/220 |
| 3,685,971 A | * | 8/1972 | Carson ........................ 422/220 |
| 3,824,080 A | | 7/1974 | Smith et al. ................. 422/191 |
| 4,140,625 A | | 2/1979 | Jensen ......................... 208/146 |
| 4,235,847 A | * | 11/1980 | Scott .......................... 422/220 |
| 4,481,105 A | * | 11/1984 | Chou ........................... 208/146 |
| 5,484,578 A | * | 1/1996 | Muldowney et al. ....... 422/220 |
| 5,882,610 A | * | 3/1999 | Darmancier et al. ........ 422/220 |
| 6,093,373 A | * | 7/2000 | Darmancier et al. ........ 422/220 |

* cited by examiner

*Primary Examiner*—Walter D. Griffin
(74) *Attorney, Agent, or Firm*—Millen, White, Zelano & Branigan, P.C.

(57) ABSTRACT

A device for distributing a poly-phase mixture comprises: at least one gas phase and at least one liquid phase, said mixture being in downflow mode through at least one bed of granular solid, comprising: at least one tray (P) located above one of said beds of granular solid, a plurality of mixer conduits (21) for said liquid and gas phases, each of said conduits comprising at least one upper cross section for flow (22) and at least one lower cross section for flow (23) allowing the mixture formed inside said mixer conduits to communicate with a bed of granular solid, said mixer conduits being provided over a portion of their height with one or more lateral cross sections for flow (26), said upper cross section for flow (22) allowing the majority of the gas phase to pass and said lateral cross section for flow (26) allowing the passage of the liquid phase into said mixer conduits and/or at least a portion of the gas phase respectively, said device comprising at least one jet disturber type dispersive system (28) with a controlled porosity below the lower cross section for flow (23) and above the bed of solid.

20 Claims, 5 Drawing Sheets

DEVICE FOR DISTRIBUTING A POLY-PHASE MIXTURE OVER A BED OF A GRANULAR SOLID, COMPRISING A POROUS JET DISTURBER ELEMENT

CROSS-REFERENCE TO RELATED APPLICATION

This application is related to Applicants concurrently filed U.S. application Ser. No. 09/835,369, entitled "Polyfunctional Sub-Assembly For Contact, Material Distribution And Heat And/Or Material Exchange Of At Least One Gas Phase And At Least One Liquid Phase", based on French Application 00/05.020 filed Apr. 17, 2000.

The present invention relates to a device for optimising distribution of a fluid comprising at least one gas phase at least a portion of which is usually formed by hydrogen and at least one liquid phase, for example, through a bed of granular solid or particles, the fluids circulating in a substantially downflow mode through said bed of granular solid (or solid particles). The invention also relates to a vessel comprising an inlet for a first liquid fluid and for a second gaseous fluid close to its upper end, containing at least one bed of granular solid and with a device of the present invention as will be described below located above said bed.

This device can be disposed.

either at the head of the vessel, which usually is a reactor, or at the outlet from a granular bed (supplying the subsequent granular bed over the whole cross section of the vessel)

The present invention is of particular application in all cases:

where the gas phase is in the vast majority compared with the liquid phase, i.e, where the ratio between the gas and the liquid is usually more than 3:1 by volume and normally less than 400:1 (3<gas vol/liquid vol<400);

where the reaction is highly exothermic and necessitates introducing a supplemental fluid, usually a gas, into the reactor to cool the gas/liquid mixture where the reaction requires intimate contact to allow a compound (for example hydrogen $H_2$) to dissolve in the liquid phase.

In particular, the present invention is applicable to gas/liquid distributors such as those used to carry out hydrocracking, hydrotreatment, hydrodesulphurisation, hydrodenitrogenation, total or selective hydrogenation of $C_2$ to $C_5$ cuts, selective hydrogenation of steam cracking gasoline, hydrogenation of the aromatic compounds in aliphatic and/or naphthenic cuts, and hydrogenation of olefins in aromatic cuts.

It is also applicable to other reactions requiring good mixing of a gas phase and a liquid phase, for example partial or complete oxidation reactions, or amination, acetyloxidation, ammoxidation or halogenation reactions, in particular chlorination.

In the specific field of hydrodesulphurisation, hydrodenitrogenation and hydrocracking, to achieve high efficiency conversions (to obtain a product containing, for example, 30 ppm (parts per million) of sulphur or less), a good distribution of gas and liquid, principally liquid, is necessary as the volume ratios are generally between about 3:1 and about 400:1 and usually about 10:1 to about 200:1, in the case of quenching, very good contact is required between the gas introduced to carry out cooling and the fluids from the process being carried out, usually termed the process fluids.

Because of the small proportion of liquid compared with the gas, one possibility used in the prior art consists, for example, of using distributor trays comprising a plurality of apertures for the passage of liquid and a plurality of downcomers for the passage of gas Descriptions of such devices can be obtained, for example, from U.S. Pat. No. 3,353,924, U.S. Pat. No. 4,385,033 and U.S. Pat. No. 3,855,068.

However, such solutions cause problems as regards the flexibility of use of the trays, and can also result in irregular supply from the different orifices if the trays are not perfectly horizontal and/or the because of the backflow caused by the huge drop in liquid and gas streams on the trays.

To overcome such disadvantages, the skilled person has been directed to use a specific arrangement of a plurality of trays the last one being either provided with means for collecting and distributing the liquid and gas phases in a separate manner as described, for example, in U.S. Pat. No. 5,232,283, or in the form of a mixture as described, for example, in U.S. Pat. No. 4,126,539, U.S. Pat. No. 4,126,540, U.S. Pat. No. 4,836,989 and U.S. Pat. No. 5,462,719.

The major disadvantage of such systems is that because of the small quantity of liquid with respect to the gas, in order to attempt to sprinkle the whole surface of said bed of granular solid properly, the skilled person is led to use a high density of downcomers, usually more than 80 downcomers per square meter as mentioned in FR-A-2 745 202. The gas velocity in the downcomers is generally from 0.5 to 5 centimeters per second (cm/s) and the liquid velocity is generally 0.05 to 1 cm/s. These velocities are, however, too low to allow simultaneous mixing and dispersion.

Because of this absence of liquid dispersion at the outlets from the downcomers, the skilled person is often constrained to install deflector plate type systems at the outlet from the orifices or downcomers as described, for example, in French patent FR-A-2 654 952, International patent application WO-A-97/46303 and in U.S. Pat. No. 5,799,877. All jet disturber type systems described in the prior art are associated with an aperture and/or a downcomer and they are shaped either as a solid impact plate as described in U.S. Pat. No. 5,799,877, FR-A-2 654 952 and U.S. Pat. No. 4,160,625 downstream a venturi shape downcomer, or are a receptacle with very low walls as described in WO-A-97146303. The disadvantages of that type of system arise from the fact that the jet disturber device does not cover the entire surface area of the reactor and that the portion of the granular solids located below said jet disturber system has very little chance of being sprinkled with liquid.

The prior art can be illustrated by the patent U.S. Pat. No. 3,524,731 and U.S. Pat. No. 3,431,084 and by the patent U.S. Pat. No. 3,824,080 that describes a device for mixing a gaseous phase and a liquid phase displaying a collector plate for the liquid phase that induces a converging movement toward a central mixing zone, inside which the liquid phase collides with the gaseous phase. None of these patents provide a teaching or a suggestion of a jet disturber device allowing a complete utilisation of the solid particles bed.

It has now been discovered that it is possible to obtain more effective sprinkling and thus better use of a bed of granular solid by reducing the density of downcomers or mixer conduits per square meter and by providing the distributor tray and/or the downcomers or mixer conduits of a porous dispersive system or an jet disturber device with a controlled porosity allowing the liquid jet at the downcomer outlet to be dispersed.

In the device of the invention, the number of mixer conduits is selected so as to increase the velocity of the different phases constituting a mixture and thus to obtain a sufficient energy to render the dispersive system effective, to provide better contact of the resulting mixture with the catalytic bed, and better homogeneity in the flow rate of the poly-phase mixture.

Advantageously, by selecting the distance separating the distributor tray and the dispersive system and the distance between the dispersive system and the bed of granular solid, this distribution can be further increased by preventing separation or sub-division of the mixture formed inside the downcomers when it traverses the distance separating the distributor tray and the dispersive system and when it transverses the distance separating the dispersive system and the catalytic bed.

The present invention concerns a device for bringing into contact and distributing a mixture comprising at least one gas phase and at least one liquid phase for a vessel containing at least one bed of granular solid, said phases being in overall downflow mode through said bed of granular solid.

In its broadest aspect, the device of the invention is defined as a device for distributing a poly-phase mixture comprising at least one gas phase and at least one liquid phase, said mixture being in downflow mode through at least one bed of granular solid, comprising:

at least one tray (P) located above one of said beds of granular solid;

a plurality of mixer conduits (21) for said liquid and gas phases of said mixture, each of said conduits comprising at least one upper cross section for flow (22) and at least one lower cross section for flow (23) allowing the mixture formed inside said mixer conduits to communicate with a bed of granular solid, said mixer conduits being provided with one or more lateral cross sections for flow (26) over a portion of their height;

said upper cross section for flow (22) allowing the majority of the gas phase of said mixture to pass and said lateral cross sections for flow (26) allowing the passage of the liquid phase into said mixer conduits and/or at least a portion of the gas phase respectively, said device comprising at least one jet disturber type dispersive system (28) with a controlled porosity located below the lower cross section for flow (23) and above the bed of solid.

In a particular implementation, the jet disturber type dispersive system (28) is characterized in that the void surface area with respect to the total surface area (porosity) is in a ratio from about 2% to about 80%, preferably about 5% to about 50% and usually about 5% to about 30%. The porosity range of the jet disturber device will be chosen according to the superficial velocity of the gas and the liquid phase, to the specific gravity of the gas and the liquid phase, to the viscosity of the gas and the liquid phase and according to the surface tension of the liquid in relationship with the nature of the surface of the jet disturber device.

In a particular embodiment, the device of the invention is a device in which a jet disturber type dispersive system is associated with each mixer conduit.

In a further particular embodiment, the device of the invention is a device in which a jet disturber type dispersive system is associated with a plurality of neighbouring mixer conduits.

In a further particular embodiment, the device of the invention is a device in which a jet disturber type dispersive system is associated with all of the mixer conduits of the device.

In a particular embodiment, the jet disturber type dispersive device of the invention is associated with at least one element for connection to at least one tray (P) or to at least one support beam for said tray (P).

In a further particle embodiment, the jet disturber type dispersive device could be located at the same level. They can also, in another further particular embodiment, be located at least at two different levels, in such a way that, preferably, the projection on the cross section of the reactor of these dispersive device belonging to different levels does not lead to superposed zones and leads to an approximately complete covering of the entire cross section of the reactor.

The distance between two successive levels is generally in the range of 1–250 mm, preferably of 5–180 mm and usually of 10–80 mm.

The distances between two successive levels are generally the same. This arrangement of the jet disturber type dispersive devices allows a better flow pattern of the gas phase, especially in case of fluctuating flow rate of the gas phase leading to some momentary extra flow rates of said gas phase.

In a further particular embodiment, the jet disturber type dispersive device of the invention, could be located at different distances from each other with respect to at least one tray (P) or to at least one support beam of said tray (P) to which they are connected by at least one connection element.

In a further particular embodiment of the jet disturber type dispersive device of the invention, at least two jet disturber type dispersive devices located at different distances are connected together by at least one connection element and the dispersive system or systems located at the shortest distance from at least one tray (P) or at least one support beam for said tray (P) is connected to said tray (P) or said support beam by at least one connection element.

In the device of the invention, the density of the mixer conduits is usually low, for example about 1 to 80 conduits per square meter, preferably 5 to 50 conduits per square meter.

The mixer conduits with a tabular shape, have generally an approximatively constant cross section. They preferably have a cylindrical pattern.

The mixer conduit generally has a diameter in the range of 0.3–10 cm, preferably 0.3–5 cm and usually, for example, in the range of 1–5 cm.

The tray can also comprise orifices for draining the liquid phase. In this case, the total surface area resulting from the sum of the flow surface areas of each of the orifices is such that the flow rate of the liquid phase through the drainage orifices is less than 10% of that of the liquid phase fraction during operation, preferably less than 5%.

The device of the present invention has the following advantages over prior art devices:

by reducing the number of mixer conduits, the gas and liquid velocities in the mixture inside the mixer conduit are increased and thus mixing and contact between the phases is encouraged;

by adding a dispersive system covering almost the whole of the reactor, optimum use of the bed of granular solid is ensured;

by using a small number of mixer conduits, a self-supported tray can be used and thus the volume of the device is minimised and the obstacles encountered by the fluid are minimised;

the device is simple and robust (a single tray in contrast to prior art devices, as described, for example, in U.S. Pat. No. 4,126,540).

Further advantages and characteristics of the invention will become clear from the description given below of embodiments that illustrate the invention.

Figure 5A:
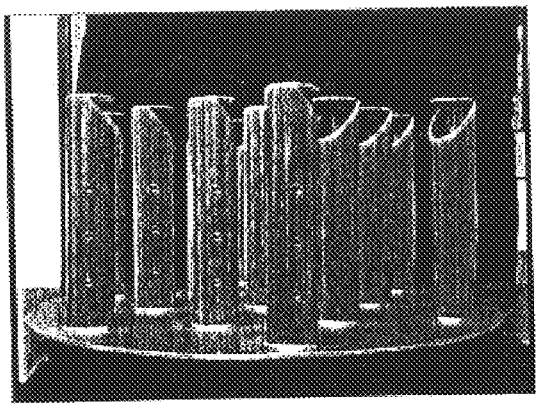
Figure 5B:
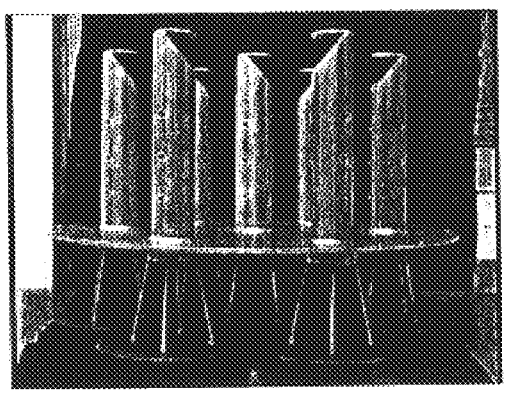
Figure 5C:
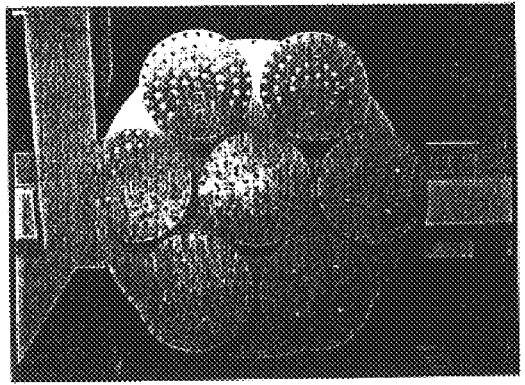
Figure 6A:
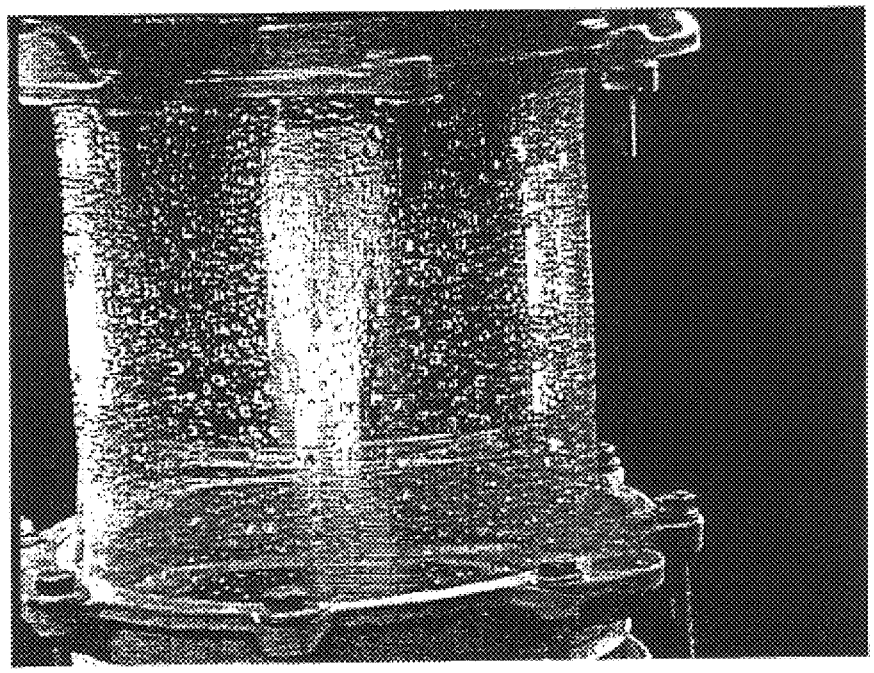
Figure 6B:
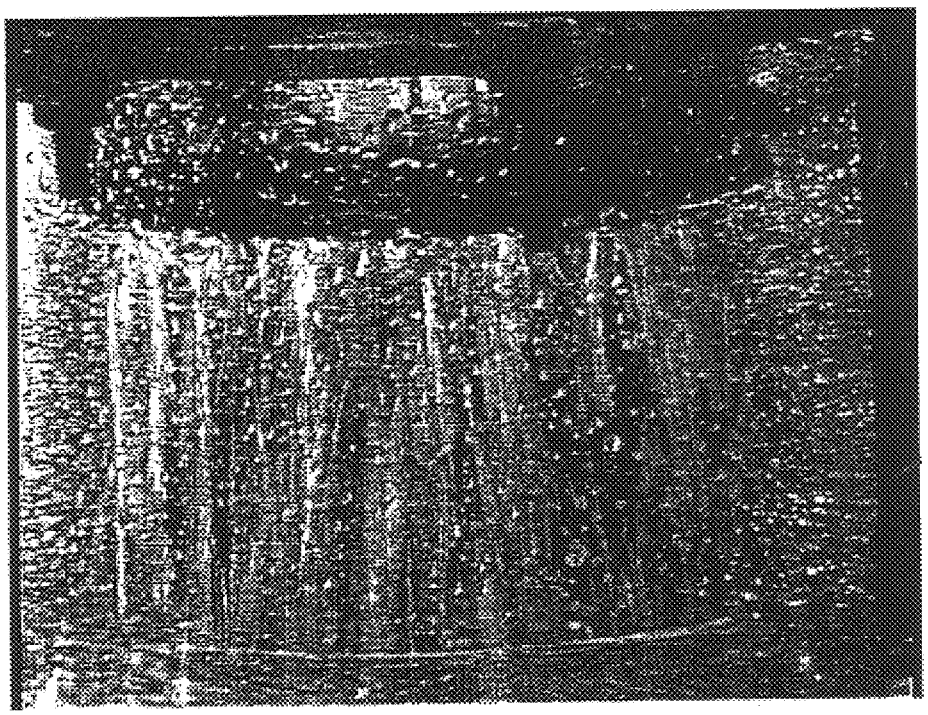

FIGS. 5a, 5b and 5c respectively show an embodiment of a tray with a prior art device (FIG. 5a) and an embodiment of a tray with a dispersive device under each downcomer, viewed from the side (FIG. 5b) and from below (FIG. 5c);

FIG. 6a is a photograph taken during tests carried out on an experimental model showing, below a prior art distribution device, a transparent portion made of, for example, Plexiglass (trade mark) showing the poor dispersion obtained when using such a device;

FIG. 6b is a photograph taken during tests carried out on an experimental model showing a transparent Plexiglass (trademark) portion below a distribution device. In this photograph, the device used is in accordance with the invention and comprises a jet disturber type dispersive device below a mixer conduit. It should be noted that there is a substantial improvement in dispersion (liquid distribution) obtained compared with the tests carried out using a prior art device (FIG. 6a)

For better comprehension of the invention, the description below given by way of example, concerns a distribution system used in a reactor for hydrotreatment. The scope of the invention also encompasses the use of this device in any apparatus and in any field where good distribution of a poly-phase fluid is required. One particular application of the device of the invention is its use for distributing a poly-phase mixture comprising at least one gas phase at least a portion of which is constituted by hydrogen.

Figure 1:
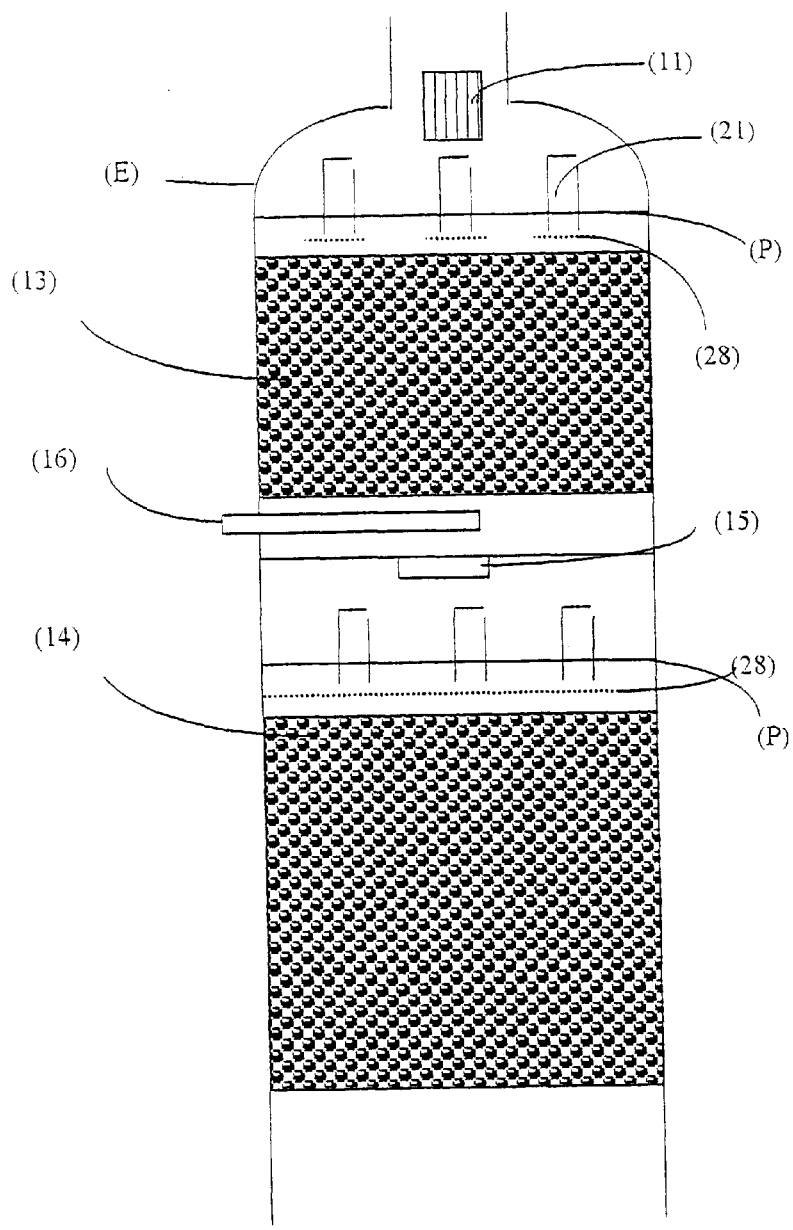
FIG. 1 shows a reactor comprising a plurality of distributor trays (P), one distributor tray (P) being located at the head of the reactor and a further tray being located after the first bed of granular solid and before the second bed of granular solid.

The reactor the upper portion of which is shown in FIG. 1 comprises a vessel (E) comprising an overhead predistributor (11). The mixture distributed by device (11) flows downwards to a distributor tray (P) located above and at a distance D from a first bed of granular solid (13) or catalytic bed. The tray comprises a plurality of mixer conduits (21) opening into a jet disturber type dispersive system (28). This distance D can be minimised to save space in the reactor and preserve the quality of distribution obtained at the outlet from the device of the present invention. After passing through the bed of granular solid (13), the two-phase mixture can either be re-distributed directly over a second bed of granular solid (14) after being passed through the device of the present invention, or as is shown in FIG. 1, after first passing through a mixing chamber (15) following introduction of a quench fluid via line (16).

Figure 2:
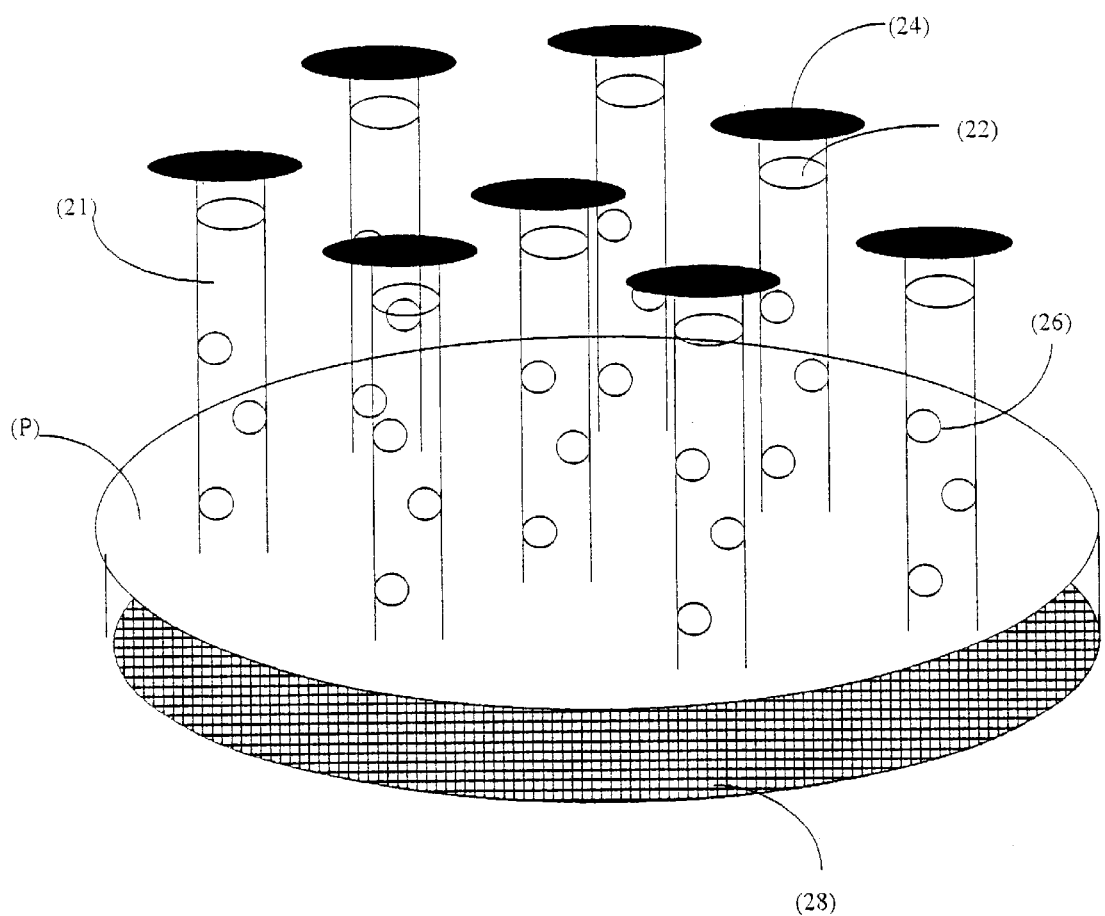
FIG. 2 shows a distributor tray provided with mixer conduits (21)

A device of the present invention is shown in perspective in FIG. 2. It comprises (FIGS. 2, 3,4) a plurality of mixer conduits such as downcomers (21) having at least one upper cross section for flow (22), for example an orifice in its upper portion and a lower cross section for flow (23) (visible in FIGS. 3 and 4). The upper portions of the downcomers are surmounted by caps (24) (jet disturber devices) intended to break jets from either the inlet line or the upper bed of granular solid and to allow separation of the gas from the liquid. These downcomers comprise a plurality of apertures (26) for passage of a liquid. Below the tray (P), a jet disturber type dispersive system (28) receives the two-phase mixture formed in conduits (21).

The mixer conduit tubes extend below the base (25) of the tray (P) by a height "z" which is normally in the range 10 to 200 mm, usually in the range 25 to 50 mm. Usually, the mixer conduit extends below the distributor tray by a height "z" and the value of "z" is less than or equal to "d", the distance between the outlet (23) of one mixer conduit and the jet disturber type dispersive system (28).

The mixer conduits (21) are perforated with apertures (26) around the edge at one or more levels, preferably at least three levels. Preferably, there is a minimum height "h" between the upper surface of tray (P) (the surface receiving liquid) and the orifices or apertures located in the lower portion of the conduit or, in the case of a slot, the bottom of the slot, which is more than height "h". This height "h" is usually in the range 5 mm to 250 mm, preferably in the range 50 mm to 100 mm.

Figure 3:
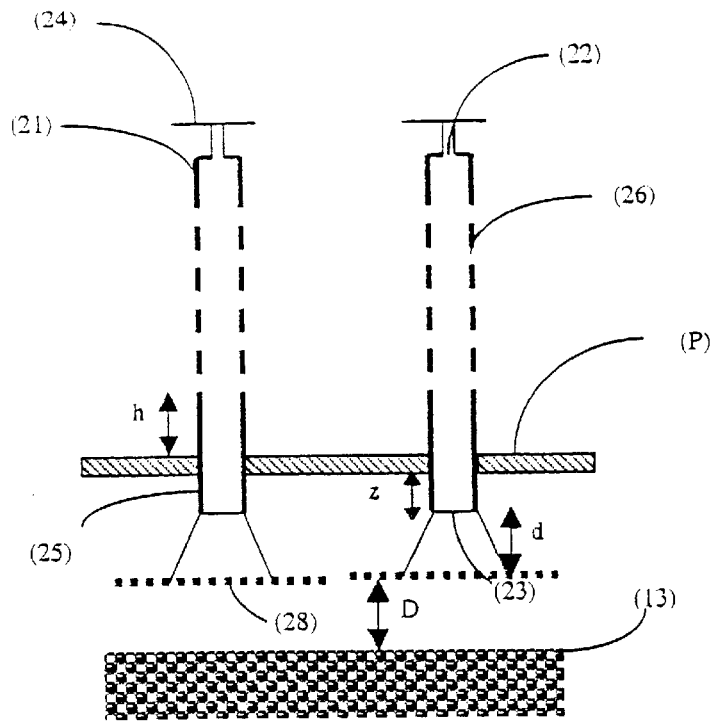
FIGS. 3 and 4 show examples of the geometry of mixer conduits (21) provided on distributor trays.
Figure 4:
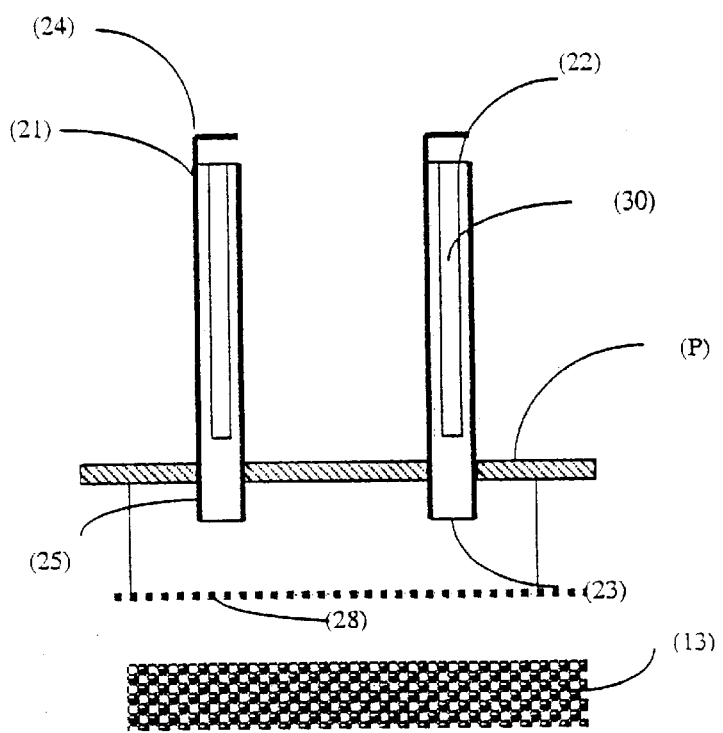

The means for ensuring dispersion of the two-phase or poly-phase mixture formed in the mixer conduit is a jet disturber device (28) with a controlled porosity that depends on the gas and liquid flow rates (sprinkling onto the surface in the form of a spray) located below and close to the cross section for flow (23). The distance "d" between the outlet (23) from the mixer conduit and the jet disturber device (28) is usually 5 to 500 mm, usually 10 to 200 mm and preferably 50 to 100 mm. The jet disturber device (28) is located a distance "D" from the bed of granular solid (13). This distance "D" between the jet disturber type dispersive system and the bed of granular solid is selected so that the mixture formed inside said mixer conduits and leaving said mixer conduits by said lower cross sections for flow is preserved until it is distributed onto the bed of granular solid. This distance "D" is normally about 0 to 500 mm, usually about 0 to 100 mm and more usually 1 to about 50 mm. In FIG. 3, each mixer conduit is associated with a jet disturber while in the device shown in FIG. 4, a single jet disturber device is associated with a plurality of mixer conduits. In the device shown in FIG. 4, each mixer conduit comprises slots (30) for the passage of liquid.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/05.021, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A distributor device for distributing a downwardly flowing poly-phase mixture, comprising at least one gas phase and at least one liquid phase, above at least one bed of granular solid, said device comprising:

at least one tray (P) located above a bed of granular solid;

a plurality of mixer conduits (21) for receiving liquid and gas phases, each of said conduits comprising at least one upper cross section for flow (22) through which a gas phase can enter said mixer conduit, and at least one lower cross section for flow (23) through which a mixture of gas and liquid communicate with a bed of granular solid, said mixer conduits having one or more lateral openings for flow (26) over at least a portion of their height through which a liquid phase can enter said mixer conduit;

said upper cross section for flow (22) allowing the majority of the gas phase of said mixture to pass and said lateral openings for flow (26) allowing the passage of the liquid phase into said mixer conduits and/or at least a portion of the gas phase wherein at least one jet disturber dispersive device (28), having a porosity, is located below said tray (P) and below the lower cross section for flow (23) and above the bed of granular solid.

2. A distributor device according to claim 1, wherein said jet disturber dispersive device has a porosity of 2%–80%.

3. A device according to claim 1, wherein there is a dispersive device is associated with each mixer conduit.

4. A distributor device according to claim 1, wherein a jet disturber dispersive device is associated with a plurality of neighbouring mixer conduits.

5. A distributor device according to claim 1, wherein a single jet disturber dispersive device is associated with all of the mixer conduits of the distributor device.

6. A distributor device according to claim 1, wherein said at least one jet disturber dispersive device is associated with at least one element for connection to said at least one tray (P) or to at least one support beam for said at least one tray (P).

7. A distributor device according to claim 1, wherein at least two jet disturber dispersive devices are associated with at least two mixer conduits, said jet disturber dispersive devices being located at different distances with respect to the tray (P) or to at least one support beam of said tray (P) to which they are connected by at least one connection element.

8. A distributor device according to claim 7 wherein said at least two jet disturber dispersive devices located at different distances are connected together by at least one connection element, and in which the jet distributor dispersive device which is closest to said tray (P) or to said at least one support beam for said tray (P) is connected to said tray (P) or said support beam by at least one connection element.

9. A distributor device according to claim 1, having a distance "d" between the lower end of the mixer conduits and the jet disturber dispersive device of about 5 to 500 millimeters.

10. A distributor device according to claim 1, having a distance "D" between the jet disturber dispersive device and the bed of granular solid, wherein said distance "D" is selected so that the mixture formed inside said mixer conduits and leaving said mixer conduits by said lower cross sections for flow is preserved until it is distributed onto the bed of granular solid.

11. A distributor device according to claim 10, in which the distance "D" is about 0 to about 500 millimeters.

12. A distributor device according to claim 9, wherein at least one mixer conduit extends below a distributor tray a distance "z" and the value of "z" is less than or equal to that of "d".

13. A distributor device according to A claim 12, wherein said mixer have a diameter in the range of 0.3–10 cm.

14. A distributor device according to claim 1, said tray comprises orifices for draining the liquid phase, the total surface area resulting from the sum of the surface areas for flow of each of the orifices being such that the flow rate of the portion of the liquid phase through the drainage orifices is less than 10% of that of the liquid phase during operation.

15. A distributor device according to claim 12, wherein said distributor device contains 1 to 80 conduits per m$^2$.

16. A distributor device according to claim 12, wherein said at least one mixer conduit has an approximately constant cross section.

17. In a process comprising distributing a poly-phase mixture comprising at least one gas phase at least partially constituted by hydrogen, the improvement wherein said distributing is conducted in a distributor device according to claim 1.

18. A distributor device according to claim 13, wherein said mixer conduits have a diameter in the range of 0.5–5 cm.

19. A distributor device according to claim 14, wherein said flow rate is less than 5%.

20. A distributor device according to claim 15, wherein said distributor device contains 5–50 conduits per m$^2$.

* * * * *